(12) United States Patent
Campbell et al.

(10) Patent No.: US 6,446,905 B1
(45) Date of Patent: Sep. 10, 2002

(54) JANUS REUSABLE SPACECRAFT SYSTEM

(75) Inventors: Harry George Campbell, Irvine;
Ronald Earle Hovden, Redondo Beach; Glenn Woodrow Law, Manhattan Beach, all of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/651,143

(22) Filed: Aug. 30, 2000

(51) Int. Cl.[7] .................................................. B64G 1/01
(52) U.S. Cl. .......................... 244/2; 244/160; 244/172; 244/135 R
(58) Field of Search ................................ 244/2, 158 R, 244/172, 120, 63, 135 R, 118.1

(56) References Cited

U.S. PATENT DOCUMENTS 3,295,789 A * 1/1967 Hill ............................ 244/162
3,369,771 A * 2/1968 Wallley et al. .............. 244/162
5,129,602 A * 7/1992 Leonard ...................... 244/172
5,143,327 A * 9/1992 Martin ...................... 244/158 R
5,217,187 A * 6/1993 Criswell ................... 244/158 R

* cited by examiner

Primary Examiner—Galen L. Barefoot
(74) Attorney, Agent, or Firm—Derrick Michael Reid

(57) ABSTRACT

A reusable spacecraft system having two substantially identically reusable return flight space vehicles, one of which is preferably a booster and the other an orbiter, each of which have identical flight control and propulsion systems and have identical but selectably installable components, such as thermal protection disposed on the orbiter but not on the booster. Each vehicle further includes identical payload bays for receiving mission specific payloads, that may be for example, a propellant tankage payload for the booster and a manned mission payload for the orbiter. The use of identical booster and orbiter vehicles reduces costs of development, production and reusable missions.

12 Claims, 5 Drawing Sheets

JANUS SPACECRAFT SYSTEM

JANUS PROPELLANT SYSTEM

JANUS SPACECRAFT SYSTEM

JANUS ORBITER VEHICLE

JANUS BOOSTER VEHICLE

JANUS PROPELLANT SYSTEM

JANUS AVIONICS SYSTEM

JANUS REUSABLE SPACECRAFT SYSTEM

FIELD OF THE INVENTION

The invention relates to the field of spacecraft. More particularly, the present invention relates to orbiter and booster spacecraft.

BACKGROUND OF THE INVENTION

In the beginning of the space program performance was an absolute objective. From the earliest days, however, the cost of launching payloads into space has been perceived as high. Failures were to be avoided or minimized from both a national and geopolitical perspective. The cost of launching current or proposed systems, while important, was not the driving force in designing, producing and operating early space launch systems. As such systems evolved, cost considerations seemingly became more important, particularly with the entrance of competing European and Asian launch vehicles. Consequently, a new mandate of cost reduction has in the past decade or so dominated decisions concerning any new or modified space launch system. Modernly, space system designers seek major cost reductions.

There are several ways to reduce costs of space systems, but not all cost reduction plans are possible. For example, the cost of placing a pound of payload in earth orbit has dramatically decreased due to the development of larger and thus more capable launch vehicles. The larger vehicles have an increased cost per launch than ballistic missile type antecedent space systems, but place much larger payloads in orbit. Accordingly, the cost per pound measure, that is a measure of the relative cost of launch systems, has substantially decreased even though the larger vehicles have a higher cost per launch. Another way to reduce cost is to recover all or part of a launch vehicle for relaunch after any repairs, replacements or refurbishments have been made. A prime example is the Space Transportation System using the Shuttle as the major reusable space system. Even with reuse or partial reuse, the cost of launch operations is deemed to be unacceptably high to many in the space community. So the cost reduction mandate has continued. Main proponents of cost reduction adhere to the philosophy that cost is high because of agency or bureaucratic management layering. Other system planners proclaim that technological breakthroughs will make the design and production process less costly. Together, these assertions claim that doing business a new way will make things cheaper. Many such cost reduction plans are simply not possible or highly unlikely. Another cost reduction candidate takes the reuse concept one step further by proposing a fully reusable vehicle. Candidate designs cover a host of concepts centered on multiple or single stage vehicles. A large number of private and government funded studies have been undertaken over the past decade aimed at supplanting the current Shuttle system with various designs that embrace the low cost mandate. In these studies, low cost is achieved by advancing the state of technology often in an overly optimistic and risky manner or by applying unrealistic cost reduction assumptions to the study of cost estimates.

Single stage to orbit designs offer good examples of technological risk because projected payload weight to orbit is extremely difficult to achieve even with very large vehicles. The slightest unanticipated weight increase in any of the many complex subsystems directly decreases payload weight capability. To achieve the relatively low structure weights, required to ensure substantial payloads, untested exotic materials and advanced propulsion devices are employed in study designs. Advanced materials have also been incorporated in various multiple stage study designs, increasing the concomitant risk of not achieving design goals and of not living up to the low cost mandate.

Another way of meeting low cost goals has been the use of commonality within subsystems or within stage designs. The concept of commonality refers to use of the same part, component, or subsystem from one design to a different application. The concept is not new and has been implemented in aircraft and selected space systems. A prime example would be a propulsion system where the cost of engine development is saved when a particular engine is used in a subsequent design application. For example, the second and third stages of the Apollo launch vehicle used the same engine. Different launch vehicles have also used the same engine. Aircraft exhibit a similar history. In certain design studies on Shuttle replacement, commonality has been incorporated in the basic structure and stage tankage as well as the propulsion system.

Lower costs will usually result when such commonality can be implemented. However, commonality fails to bring about dramatic cost savings, when applied to a multiple stage launch vehicle, because each stage must be separately designed, tested and qualified, all of which represents a huge proportion of development cost. Accordingly, when studies have asserted that a two stage vehicle has the same design for each stage or similar designs, a thorough examination of the detailed weights reveals that, in fact, the stages may only be similar, and not exactly common to each other. For example, even when outside diameters of a few tank sections may be exactly the same, the stage will have different propellant capacities signifying the inherent desire of engineering designers to maximize performance. The result will be weights that differ for tanks and related structure thus failing to achieve complete commonality.

None of the known studies over the years have adopted complete commonality of both stages of a two stage launch vehicle as a driving force for cost reduction. The reasons are not obvious although the concept is relatively obvious. Designers invariably use performance optimization as a primary design objective. The physics of space flight require the use of larger lower stages and smaller upper stages failing to have commonality between the two stages. Where commonality has been applied, commonality has been applied piece meal with differing engines, tank sections or electronics, resulting, in fact, in a lack of substantial true commonality. True substantial commonality would result in only one cost of developing a system.

It appears that launch costs can be lowered through the use of a two stage vehicle where each stage is exactly the same in terms of design, development, test, qualification, production and operation. In essence, only one stage of the vehicle need be developed, only one engine and only one set of electronics, basically saving the cost of a second stage development. Production cost will be dramatically reduced because vehicles will reap the benefit of doubled quantity with economy of production run. Launch operations will be simplified because only one type of stage will need to go through the checkout procedure and subsequent refurbishment after landing. The disadvantage to the commonality design approach is that the stage must be somewhat over designed to perform both the booster and orbiter functions. However, the marginal development costs of a somewhat more capable stage is dwarfed by the savings of not having to develop and qualify another stage.

Hence, it is desirable to have a space system that offers maximum commonality to achieve cost reduction. In the case of a space system having a reusable return flight mission vehicle that is launched under propellant thrust and returns to earth through flight, such as the Shuttle, booster stages, such as the external tank and solid rocket booster, are used to aid launching the vehicle into space. The solid rocket boosters may be retrieved for later reuse. A more recent design of a reusable return flight mission vehicle having no external booster is the X33. Such a system pays a high price for combining the payload and required propellant into a single space vehicle. The resulting payload capacity is disadvantageously limited probably rendering the X33 impracticable. In one of the original proposals for the space shuttle, a design using a reusable winged booster including flight surfaces for unmanned return flights back to earth under aerodynamic flight was suggested. But again, due to the difference in mission requirements, this original launch booster design was substantially different from the Shuttle orbiter vehicle. Due to perceived differences in mission requirements, designers have failed to offer substantial commonality between the reusable return flight booster and orbiter vehicles. That is, engineers have an inherent tendency to design the best performing booster and best performing orbiter each having differing mission requirements resulting in differing designs fundamentally lacking maximum commonality. True substantial commonality has not been achieved in reusable return flight space vehicles. For 40 years there has been a strong long felt, but unsatisfied, need for inherent cost reduction, but true commonality has not been applied between boosters and orbiters because of inherent differing performance requirements coupled with inherent goals to design the best performing vehicles. These and other disadvantages are solved or reduced using the invention.

SUMMARY OF INVENTION

An object of the invention is to provide commonality between reusable return flight boosters and orbiters.

Another object of the invention is to provide commonality between reusable return flight boosters and orbiters having identical payload bays into which is respectively placed differing payloads.

Still another object of the invention is to provide commonality between reusable return flight boosters and orbiters having identical payload bays into which is respectively placed a propellant payload and a mission payload.

Yet another object of the invention is to provide commonality between reusable return flight boosters and orbiters having identical payload bays into which is respectively placed a propellant payload and a mission payload such that the booster and orbiters are identical spacecraft vehicles but with preferably differing payloads.

Still a further object of the invention is to provide maximum commonality between two reusable return flight space vehicles having identical payload bays into which is respectively disposed a propellant payload and a mission payload such that the two are identical spacecraft vehicles but with preferably differing payloads performing differing missions.

The invention is directed to a reusable spacecraft system having two substantially identically reusable return flight space vehicles forming a Janus type reusable spacecraft system of which one of the vehicles is conveniently referred to as a booster vehicle and the other as an orbiter vehicle. Such references suggest the type missions that the respective vehicles will have during a space mission. Both vehicles include a substantially similar payload bay into which is preferably placed differing payloads depending on mission requirements. The invention effectively equates booster propellant as a mission payload disposed in a mission payload type payload bay. In the preferred form, a propellant payload is disposed in the payload bay of the booster vehicle and a non-propellant mission payload is disposed in the payload bay of the orbiter vehicle. As such, the two vehicles possess maximum desired commonality for reduced costs of development, production, testing, launch, refurbishment, and relaunching, and possess flight surfaces for flight returns to earth for subsequent reuse. These and other advantages will become more apparent from the following detailed description of the preferred embodiment.

DETAILED DESCRIPTION OF THE PREFERRED EMBODIMENT

Figure 1:
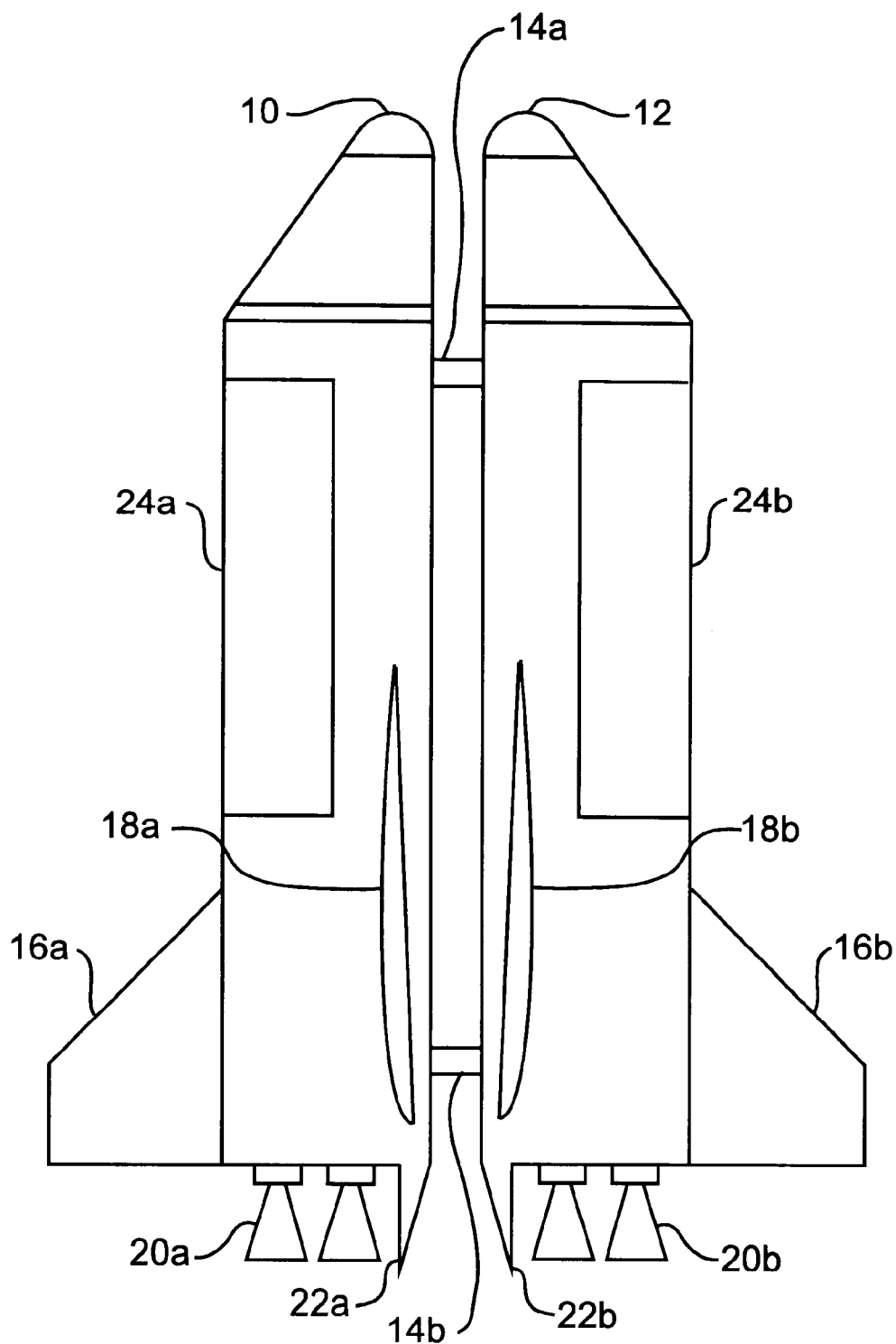
FIG. 1 depicts a Janus spacecraft system.
Figure 2A:
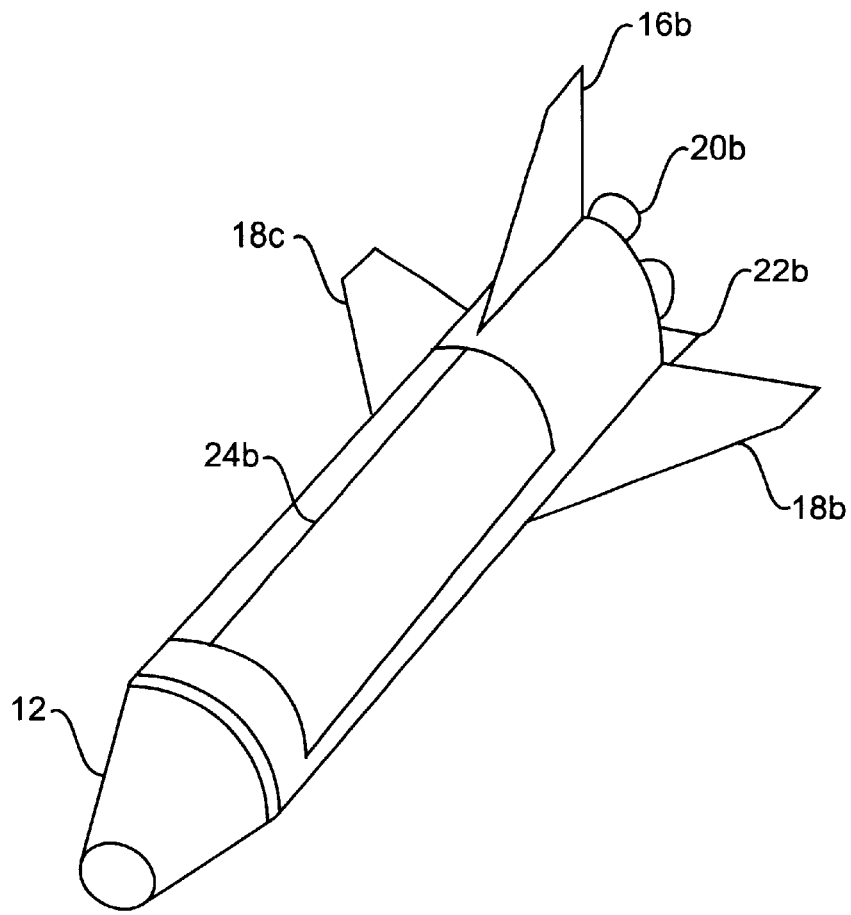
FIG. 2A depicts a Janus orbiter vehicle.
Figure 2B:
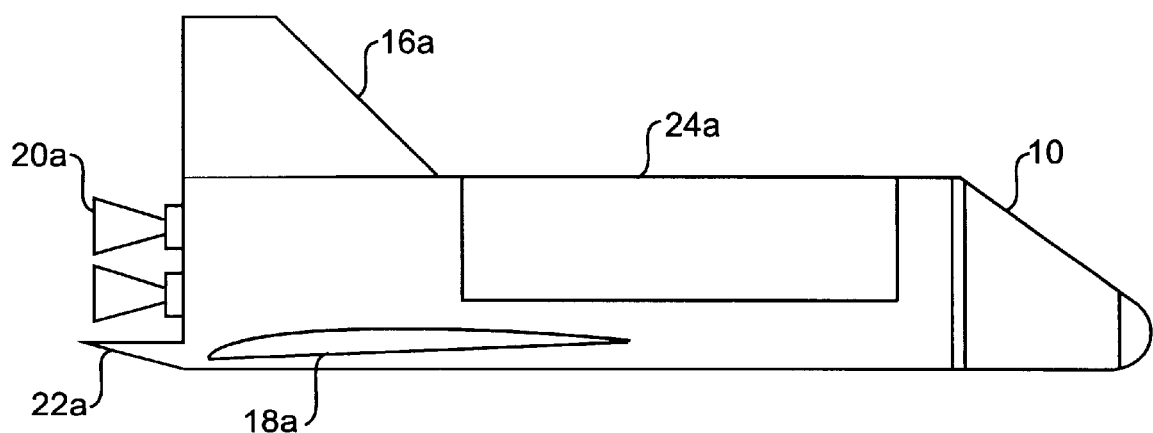
FIG. 2B depicts a Janus booster vehicle.

An embodiment of the invention is described with reference to the figures using reference designations as shown in the figures. Referring to FIGS. 1, 2A and 2B, a reusable spacecraft system has two identical space vehicles, conveniently referred to as a Janus spacecraft system having a Janus booster vehicle 10 and a Janus orbiter vehicle 12. Preferably, as shown, the two vehicles 10 and 12 are positioned belly to belly during a launch. The two vehicles are interconnected together during launch and such coupling is represented by a top coupling means 14a and a bottom coupling means 14b. These coupling means 14a and 14b may include fuel and electrical conduits. The booster and orbiter vehicles 10 and 12, respectively possess preferably identical flight surfaces for return flights including tails 16a and 16b and wings 18a and 18b, rocket engines 20a and 20b for launch propulsion, body flaps 22a and 22b for vehicle control during reentry, payload bay doors 24a and 24b. In FIG. 2A the orbiter right wing 18c is shown.

Figure 3A:
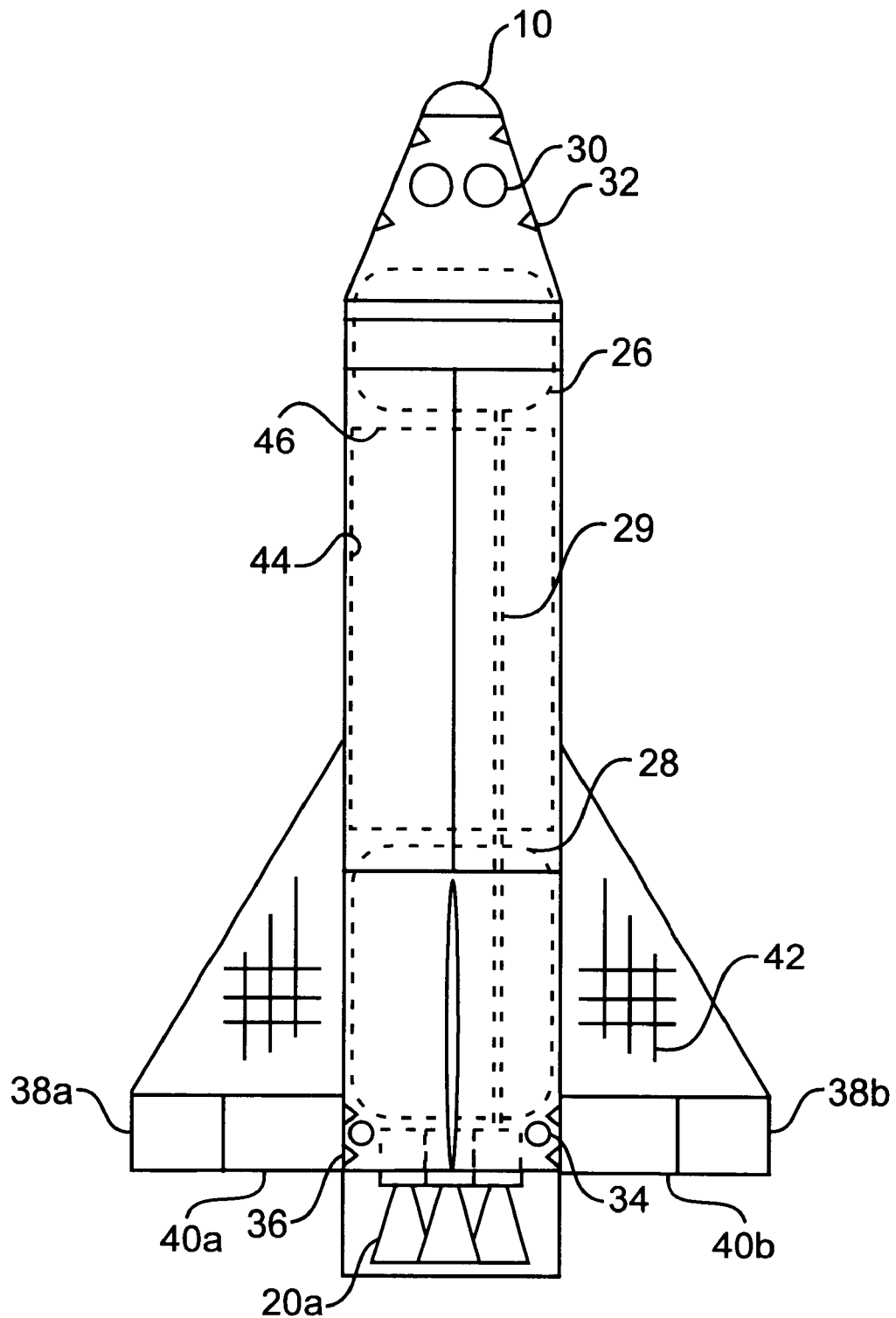
FIG. 3A depicts a Janus propellant system.
Figure 3B:
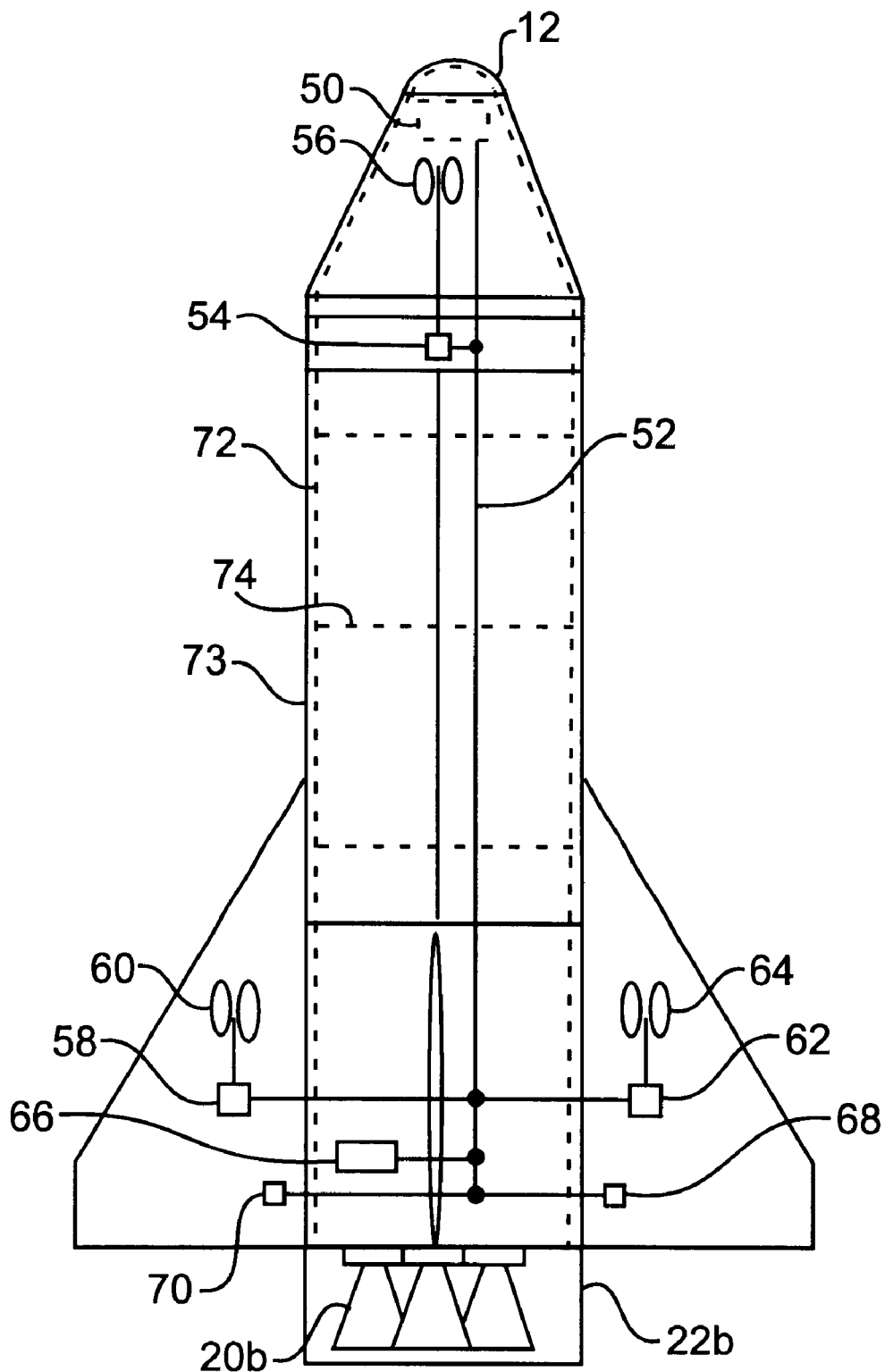
FIG. 3B depicts a Janus avionics system.

Referring to FIGS. 1, 2A, 2B, 3A, and 3B, and more particularly to FIGS. 3A and 3B, each of the vehicles 10 and 12 have an identical propellant system including a fuel tank 26, oxygen tank 28, fuel plumbing 29, nose thruster propellant tank 30, nose thrusters 32, tail propellant tank 34, tail thrusters 36, left outboard elevon 38a, right outboard elevon 38b, left inboard elevon 40a, right inboard elevon 40b, thermal protection system 42, payload bay 46 for receiving a payload 44. Each of the vehicles 10 and 12 also have an identical avionics system including an avionics subsystem 50 for guidance, wiring harness 52 for electrical communication, nose landing gear actuator 54, nose landing gear 56, left landing gear actuator 58, left landing gear 60, right landing gear actuator 62, right landing gear 64, reaction control electronics 66, right elevon actuators 68, left elevon actuators 70, supporting stringers 72, vehicular skin 73, and supporting struts 74.

The two vehicles may have minor installation differences that are typically a selection process in terms of what components of vehicles 10 and 12 are installed. For example, typically the booster 12 does not reach earth orbit and returns to earth from a relatively low altitude such that complete thermal protection of the booster 12 is not necessary. The thermal protection is heavy and adds to fuel consumption. The lack of thermal protection on the booster would increase fuel economy. The orbiter 12 however reaches high earth orbit requiring the use of thermal protection during reentry and flight return. For another example, the booster may not have installed nose and tail thrusters and tanks 30, 32, 34 and 36, because the booster 12 would not normally require space based microthrusting and maneuvering to accomplish a desired space mission. The thrusters and tanks 30, 32, 34 and 36 and controller 66 comprise a complete reaction control system that may be selectively installed in the orbiter vehicle 12 but not in the booster vehicle 10. For yet another example, the software in the system components, such as the flight avionics subsystem, can be loaded with different software tailored to a specific mission requirement, such as a booster mission of the booster 10 or a space mission of the orbiter 12. That is, the reusable vehicles 10 and 12 are identically adapted for selective hardware and software installations tailored for the specific mission, yet otherwise retain true commonality.

In the preferred form, the booster 10 primarily performs a booster mission that is used to merely help boost the orbiter 12 into space. However, it should be understood that the vehicles are inherent non-mission specific as designed. The selective installation of auxiliary components such as the thermal protection and thrusters 32 and 34 are selected for installation based upon the desired mission. When both vehicles are identically selectively installed with identical components, the two vehicles will be identical. As such, only one design cycle is required for both of the vehicles.

The payload 44 loaded into the payload bay is also mission specific. In the preferred form, the payload bay 46 of the booster 10 receives a propellant payload 44 for a typical boosting mission whereas the payload bay 46 of the orbiter 12 is preferably loaded with a mission specific payload such as a deployable satellite. The mission specific payload of the orbiter could be a manned payload where astronauts and crew reside during an orbiter mission. Vehicles with maximum desired commonality including at least the propulsion and flight control components will be necessarily identical in both vehicles 10 and 12.

Figure 4:
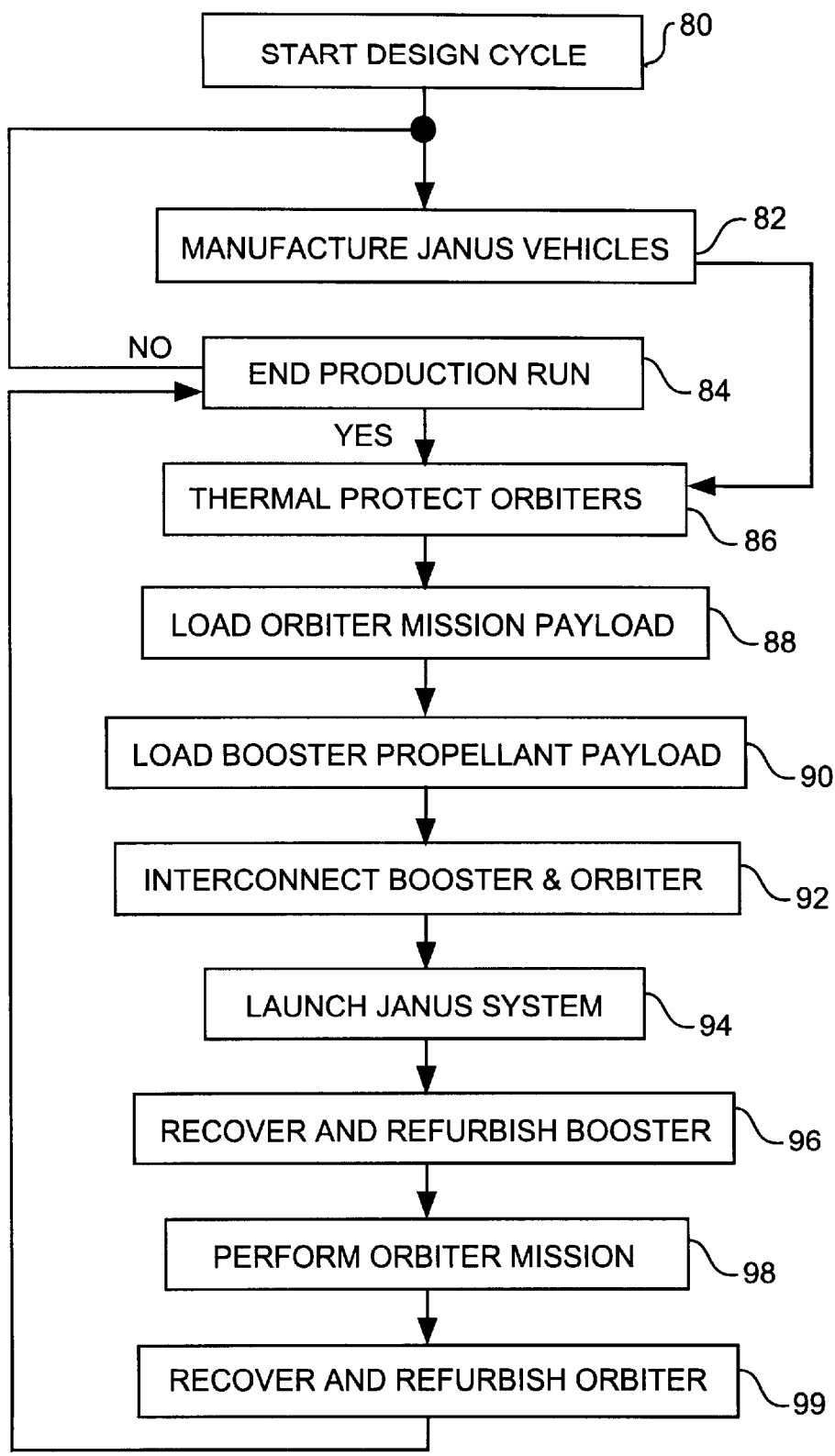
FIG. 4 is a flow diagram of a Janus system reuse method.

Referring to all of the Figures, and more particularly to FIG. 4, the Janus spacecraft system is subject to a reuse process for repeated launching of the system. The reuse process includes designing 80 the spacecraft system 10, 12, 14a and 14b, manufacturing 82 the vehicles 10 and 12, ending a desired production run 84, thermal protecting 86 the orbiter 12, loading 88 the orbiter payload bay 46 of the orbiter 12 with an orbiter payload 44, loading 90 a booster propellant payload 44 into the booster payload bay 46, interconnecting 92 the booster 10 to the orbiter 12 using the top and bottom coupler 14a and 14b, respectively, launching 94 the spacecraft system 10, 12, 14a and 14b, recovering and refurbishing 96 the booster 10, performing 98 an orbiter mission, and recovering and refurbishing 99 the orbiter 12.

The reuse method is generally equally applied to both vehicles. In the preferred form, the booster 10 performs a booster mission in advance of which is loaded additional propellant into the propellant payload 44 disposed in the payload bay 46. The actual detailed load may vary. For example, the propellant payload may be a simple tank filled with propellant that may be pumped into the tank before or after the tank is disposed in the payload bay. Many variations of the method are possible.

The Janus reusable spacecraft system need not advance the state of technology. For example, conventional liquid oxygen and fuels of the propulsion system will reduce required experimentation. Accordingly, the system need not push the frontiers of technology and is economically feasible. The present invention is characterized as a Janus spacecraft system having two substantially identical space vehicles. These vehicles have identical major system components, and installation variations are possible but still only require one design and development for both vehicles offering true commonality and cost reduction. Those skilled in the art can make enhancements, improvements, and modifications to the invention, and these enhancements, improvements, and modifications may nonetheless fall within the spirit and scope of the following claims.

What is claimed is:

1. A spacecraft system for repeated launches from earth, for repeated return fights to earth, and for performing respective space missions, the spacecraft comprising, first reusable vehicle comprising a first set of flight surfaces for return flight to earth, a first payload bay for receiving a first payload for performing a first space mission, and a first engine for launching the first vehicle from earth, second reusable vehicle comprising a second set of flight surfaces for return flight to earth, a second payload bay for receiving a second payload for performing a second space mission, and a second engine for launching the second vehicle from earth, the first and second flight surfaces are identical, the first and second payload bays are identical, the first and second engines are identical, and coupling means for coupling together the first and second reusable vehicles during launching of the first and second vehicles, wherein:

the first vehicle is a booster vehicle;

the first payload is a propellant payload, and the coupling means communicates propellant from the propellant payload in the booster vehicle to the second engines, and the first and second engines entirely provide lift off propulsion of the spacecraft system;

the first payload mission is a booster mission;

the second vehicle is an orbiter vehicle;

the second payload is a mission payload; and the second payload mission is an orbiter mission.

2. The system of claim 1 wherein the first and second reusable vehicles are identically adapted for selective installation of mission specific means.

3. The system of claim 1 wherein the first and second vehicles each further comprise identical avionics systems.

4. The system of claim 1 wherein the first and second vehicles each further comprise identical propellant tankage.

5. The system of claim 1 wherein the first and second vehicles each further comprise identical elevon flight surfaces.

6. The system of claim 1 wherein the first and second vehicles each further comprise identical reaction control thrusters.

7. The system of claim 1 wherein the first and second vehicles each further comprise identical outer skin shape.

8. The system of claim 1 wherein the first and second vehicles each further comprise identical structure frame of struts and stringers.

9. The system of claim 1 wherein the first and second vehicles each further comprise identical landing gear.

10. The system of claim 2 wherein the mission specific means comprises thermal protection.

11. The system of claim 2 wherein the mission specific means comprises reaction control thrusters.

12. The system of claim 2 wherein the mission specific means comprises a programmed computer having loaded mission specific selective software.

* * * * *